United States Patent
Zellner et al.

(10) Patent No.: US 7,092,947 B2
(45) Date of Patent: Aug. 15, 2006

(54) BROWSER ON TEST EQUIPMENT

(75) Inventors: Samuel N. Zellner, Dunwoody, GA (US); Nathan Sargent, Acworth, GA (US); Mark J. Enzmann, Roswell, GA (US); Robert T. Moton, Jr., Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/334,874

(22) Filed: Dec. 30, 2002

(65) Prior Publication Data

US 2003/0093406 A1 May 15, 2003

Related U.S. Application Data

(63) Continuation of application No. 09/586,066, filed on Jun. 2, 2000, now Pat. No. 6,539,384.

(51) Int. Cl.
*G06F 17/30* (2006.01)
*G06F 17/00* (2006.01)

(52) U.S. Cl. ............................ 707/10; 707/3
(58) Field of Classification Search ................ 370/245, 370/249, 255, 338; 379/21, 32.01, 88.23, 379/356.01, 17; 375/220, 221, 222; 361/681, 361/600; 709/200, 224, 231, 250; 714/712; 70/58; 16/429
See application file for complete search history.

(56) References Cited

U.S. PATENT DOCUMENTS

| | | | | |
|---|---|---|---|---|
| 3,600,525 A | * | 8/1971 | Garrett et al. | 379/17 |
| 3,792,205 A | * | 2/1974 | O'Dea | 379/21 |
| 4,295,179 A | * | 10/1981 | Read | 361/600 |
| 5,075,926 A | * | 12/1991 | Jeong | 16/429 |
| 5,351,508 A | * | 10/1994 | Kelley | 70/58 |
| 5,850,386 A | | 12/1998 | Anderson et al. | 370/241 |
| 5,850,388 A | | 12/1998 | Anderson et al. | 370/252 |
| 5,917,905 A | * | 6/1999 | Whipple et al. | 379/356.01 |
| 5,978,940 A | | 11/1999 | Newman et al. | 714/712 |
| 6,002,671 A | | 12/1999 | Kahkoska et al. | 370/248 |

(Continued)

OTHER PUBLICATIONS

Description of Harris Dracon TS22ALO Test Set, p. 1, available on Dec. 19, 1999 at http://www.wisecomponents.com/ets/showpage.cgi?template=_templates/ts22alo.html.

(Continued)

*Primary Examiner*—Apu M. Mofiz
(74) *Attorney, Agent, or Firm*—Hope Baldauff Hartman, LLC

(57) ABSTRACT

A portable telecommunication test set, such as a telephone line butt set, with a web browser incorporated therein. A standard HTML (Hyper Text Mark-up Language) or WAP (Wireless Application Protocol) browser may be incorporated within the portable test set, allowing a network technician to access the Internet as well as other remotely-located sources of information to retrieve data and other useful technical information while in the field for communication network or telephone line maintenance, troubleshooting or repair. The test set may contain memory to locally store certain technical information, e.g., telephone line-specific data or circuit information, that may be retrieved and "read" by the built-in browser module when prompted by the network technician. The web browser may display the content of the requested information on a display provided on the test set. Line-specific (as well as manufacturer-specific) test information need not be in a manufacturer-dictated proprietary format, but, instead, may be in a generally available text format, e.g., the HTML format or the WML (Wireless Mark-up Language) format. Testing-related data may thus be supplied (as hardware or software plug-in modules) by a vendor other than the manufacturer of the test set.

29 Claims, 5 Drawing Sheets

U.S. PATENT DOCUMENTS

| | | | | |
|---|---|---|---|---|
| 6,064,372 | A | 5/2000 | Kahkoska | 345/173 |
| 6,160,871 | A | 12/2000 | DuRee et al. | 379/9 |
| 6,230,006 | B1 | 5/2001 | Keenan et al. | 455/424 |
| 6,249,516 | B1* | 6/2001 | Brownigg et al. | 370/338 |
| 6,252,942 | B1* | 6/2001 | Zoiss et al. | 379/21 |
| 6,320,946 | B1 | 11/2001 | Enzmann et al. | 379/143 |
| 6,327,350 | B1 | 12/2001 | Spangler et al. | 379/115.01 |
| 6,381,604 | B1 | 4/2002 | Caughran et al. | 707/10 |
| 6,385,300 | B1 | 5/2002 | Mohammadian et al. | 379/21 |
| 6,385,301 | B1* | 5/2002 | Nolting et al. | 379/32.01 |
| 6,397,359 | B1 | 5/2002 | Chandra et al. | 714/712 |
| 6,417,672 | B1 | 7/2002 | Chong | 324/520 |
| 6,434,221 | B1 | 8/2002 | Chong | 379/27.01 |
| 6,542,738 | B1 | 4/2003 | Keenan et al. | 455/424 |
| 6,574,310 | B1 | 6/2003 | Hartman et al. | 379/21 |
| 6,584,501 | B1* | 6/2003 | Cartsonis et al. | 709/224 |
| 6,819,655 | B1 | 11/2004 | Gregson | 370/242 |
| 6,891,803 | B1 | 5/2005 | Chang et al. | 370/252 |
| 2002/0036713 | A1 | 3/2002 | Zhang et al. | 348/607 |
| 2002/0064255 | A1 | 5/2002 | Mohammadian et al. | 379/21 |
| 2003/0174813 | A1 | 9/2003 | Mohammadian et al. | 379/22 |
| 2004/0208293 | A1 | 10/2004 | Mohammadian et al. | 379/21 |

OTHER PUBLICATIONS

White Paper of Mar. 10, 1999, on "What is a Protocol Analyzer?," pp. 1-10, available on Dec. 19, 1999 at http://www.wwgsolutions.com/techlibrary/articles/protocol.html.

Product Information for T-BERD 310 Communications Analyzer, pp. 1-3, available on Dec. 19, 1999 at http://www.ttc.com/products/html/p_list/tb310gen.html.

Description of MGTS diagnostic system, pp. 1-2, available on Dec. 17, 1999 at http://www.tekelec.com/products/mgts.pdf.

Product Highlights for MGTS diagnostic system, pp. 1-5, available on Dec. 17, 1999 at http://www.tekelec.com/products/mgts/default.asp.

Wireless Application Protocol Wireless Datagram Protocol Specification of May 14, 1999, pp. 1, 8-12, 15-32, 37, available on Dec. 17, 1999 at http://www.wapforum.org/what/technical/SPEC-WDP-19990514.pdf.

Application Note of Nov. 6, 1998, on "Using a Web browser to connect to the DominoServer," pp. 1-3, available on Dec. 17, 1999 at http://download.wg.com/appnotes/dominoserver_browser.pdf.

Wireless Application Protocol Architecture Specification of Apr. 30, 1998, pp. 1, 7-9, 11-19, available on Dec. 17, 1999 at http://www.wapforum.org/what/technical/SPEC-WAPArch-19980430.pdf.

Description of an NAMS Local Number Portability Application, p. 1, available on Dec. 19, 1999 at http://www.digilog.com/LNPAPP.HTM.

Description of an NAMS Frame Relay Application, pp. 1-4, available on Dec. 19, 1999 at http://www.digilog.com/FRAPP.HTM.

Description of an NAMS SS#7 Application, pp. 1-6, available on Dec. 19, 1999 at http://www.digilog.com/SS7APP.HTM.

Acterna's FST-2000 TestPad, User Interface Module (UIM) Version 6.

Acterna Launches Wireless and Internet-Enabled TestPad, http://www.ada.com/united_states/News_And_Events/News_Releases/PR02/053002_2.ht . . . Sep. 7, 2005.

* cited by examiner

BROWSER ON TEST EQUIPMENT

CROSS REFERENCE TO RELATED APPLICATIONS

This application is a continuation of U.S. patent application Ser. No. 09/586,066, filed Jun. 2, 2000 now U.S. Pat. No. 6,539,384.

BACKGROUND OF THE INVENTION

1. Field of the Invention

The present invention broadly relates to test instruments, and more particularly, to a portable telecommunication test set with a built-in web browser.

2. Description of the Related Art

Telephone communication has seen a phenomenal growth since its inception because of its extreme usefulness in today's world. It is hard, and almost impossible, to conceive of a world without telephones. Many people would say that telephones have become an integral part of a civilized society. Telephone communications typically take place over the traditional pair of copper conductors which form telephone lines. However, a number of different "non-traditional" transmission media, such as fiber optic cables, microwave links (in satellite communication), terrestrial radio links (in wireless communication), etc, are increasingly being employed to accommodate burgeoning telephone traffic world-wide. In any event, traditional telephone lines of a PSTN (Public Switched Telephone Network) or a POTS (Plain Old Telephone System) still play major roles as primary telephone transmission media for a large number of telephone calls. Further, a significant number of telephone calls placed over so-called "non-traditional" transmission media still end up utilizing these telephone lines as secondary transmission media for call completion. Modem computers with data transmission capabilities also frequently use the telephone lines supported by the PSTN (or POTS) for data communication with remote destinations.

A telephone subscriber's telephone line typically terminates at a local switching facility or local office in the telephone service provider's network. Two or more local offices may be connected to a central switching facility via additional telephone lines to allow inter-office telephone communication. A telephone "subscriber's loop" may normally consist of the subscriber's telephone unit, the telephone line between the subscriber's unit and the local office and a circuit at the local switching facility to supply battery current (to the subscriber's telephone unit), signaling current (over the telephone line) and a means of connecting the subscriber's telephone line to a switching unit within the local switching facility. To facilitate a two-way telephone communication over the subscriber's loop, it is necessary to maintain each subscriber's telephone line as well as other circuit elements fault-free.

Maintenance, monitoring and troubleshooting of a telephone line is performed by a lineman or network technician employed by the telephone service provider. The technician may carry a hand-held butt set or test set 10 illustrated in FIG. 1 to test the telephone line for proper ringing signals, dial tone reception, noise level, etc. The butt set 10 is normally attached to the telephone line being tested with a pair of alligator or bed-of-nails clips (not shown) provided as part of the butt set 10 and extending from a housing 12. The housing 12 has a keypad 14 with buttons quite similar to those on a telephone unit to enable the technician to dial a telephone number or to enter specific digits, e.g., to check whether the telephone line carries dialed signals or to place a phone call. The housing 12 may have a built-in speaker unit (not shown) that may be activated with the SPK button on the keypad 14 so that the technician may listen to various tones, noise and other signals over the telephone line hands-free. The LNR button on the keypad 14 allows for a "Last Number Redial" function. The DAT button on the keypad 14 may be pressed to override data lockout capability, which refers to a capability of the test set 10 to alert the technician when there is a danger of inadvertently disrupting data flowing over the telephone line, such as when the test set 10 is attached to the telephone line and the technician attempts to switch the line from data mode to talk mode.

Upon finding a faulty telephone line, the technician may need to refer to additional information, e.g., cable records pertaining to a given telephone line or any line-specific circuit details. One disadvantage with the prior art butt set 10 is that the technician may not retrieve the requisite data from the butt set 10 while in the field. If the technician wants the desired information while in the field, the technician may need to contact either another technician who is knowledgeable about the given line configuration or the technician's home office where someone can find the needed information. When a technician is dependent on others for information retrieval, there will typically be a greater delay in obtaining the needed information. Such a delay may affect performance efficiency and project execution timing for a given maintenance or troubleshooting project and may not be desirable, especially when labor costs need to be contained.

It is therefore desirable to have a multi-functional, hand-held butt set or a similar portable telecommunication test set that is capable of storing telephone line-specific data and circuit information so as to enable a technician to obtain requisite information while in the field. It is further desirable that the test set or the butt set be capable of accessing a remote information server from the field location if additional information is desired by the technician.

SUMMARY OF THE INVENTION

The present invention contemplates a portable telecommunication test set comprising a housing having located therein a processing unit; a testing module coupled to said processing unit, wherein the testing module is configured to receive a first indication from the processing unit and to responsively initiate one or more test operations for a telecommunication entity; and a web browser module coupled to said processing unit, wherein the web browser module is configured to receive a second indication from the processing unit and to responsively initiate data communication between said web browser module and a source of information located external to the portable telecommunication test set. The portable telecommunication test set may include a telephone line butt set, a protocol analyzer, a communications analyzer, etc.

In addition to routine telecommunication test circuits and/or circuits for telephone functionality, the test set of the present invention, e.g., a butt set, may incorporate a standard HTML (Hyper Text Mark-up Language) or WAP (Wireless Application Protocol) browser within it. The inclusion of a web browser within a telecommunication test set allows a network technician to access the Internet as well as other remotely-located sources of information to retrieve data and other useful technical information while in the field for communication network or telephone line maintenance, troubleshooting or repair. The remotely-located source of information may be a computer server or other test equipment similar to the test set according to the present invention. The portable test set, e.g., the butt set, may contain memory to locally store certain technical information, e.g., telephone line-specific data or circuit information, that may be retrieved and "read" by the built-in web browser module when prompted by the network technician.

The portable test set may be provided with a display screen on the housing for the test set to display the content of the information retrieved from a remotely-located source of information. The web browser module may convert the received information into a user-understandable format prior to its display on the display screen. A keyboard or keypad may also be provided on the housing to allow the network technician to enter one or more commands therewith, e.g., for performing a test operation or for initiating a data retrieval operation using the web browser.

In one embodiment, the butt set according to the present invention includes a data modem within its housing to allow the web browser module to dial into a remote wireline network, e.g., the Internet, to retrieve data from the external source of information. In an alternative embodiment, the housing of the butt set includes a wireless modem and an RF (radio frequency) communication unit (including an RF transceiver unit and an RF antenna unit) to facilitate data communication between the butt set and the external source of information via a wireless network, e.g., a cellular telephone network.

The present invention imparts flexibility to the network technician while in the field. Because the present invention allows for the expeditious availability of needed test and circuit data, the performance efficiency of the network technician is advantageously improved. A further advantage of the present invention is that a web browser provides a generic or standardized information interface for the test set because it dispenses with the need to have proprietary formats for information retrieval, storage and display. For a butt set, the line-specific (as well as manufacturer-specific) test information need not be in a manufacturer-dictated proprietary format, but, instead, may be in a generally available text format, e.g., the HTML format or the WML (Wireless Mark-up Language) format. This allows for creation of a more generic test set because of reliance on the data available in a universal format, instead of a proprietary format. Testing-related data may be supplied (as hardware or software plug-in modules) by a vendor other than the manufacturer of the test set. These and other advantages and benefits of the present invention will become apparent from the description of the embodiments below.

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

Figure 1:
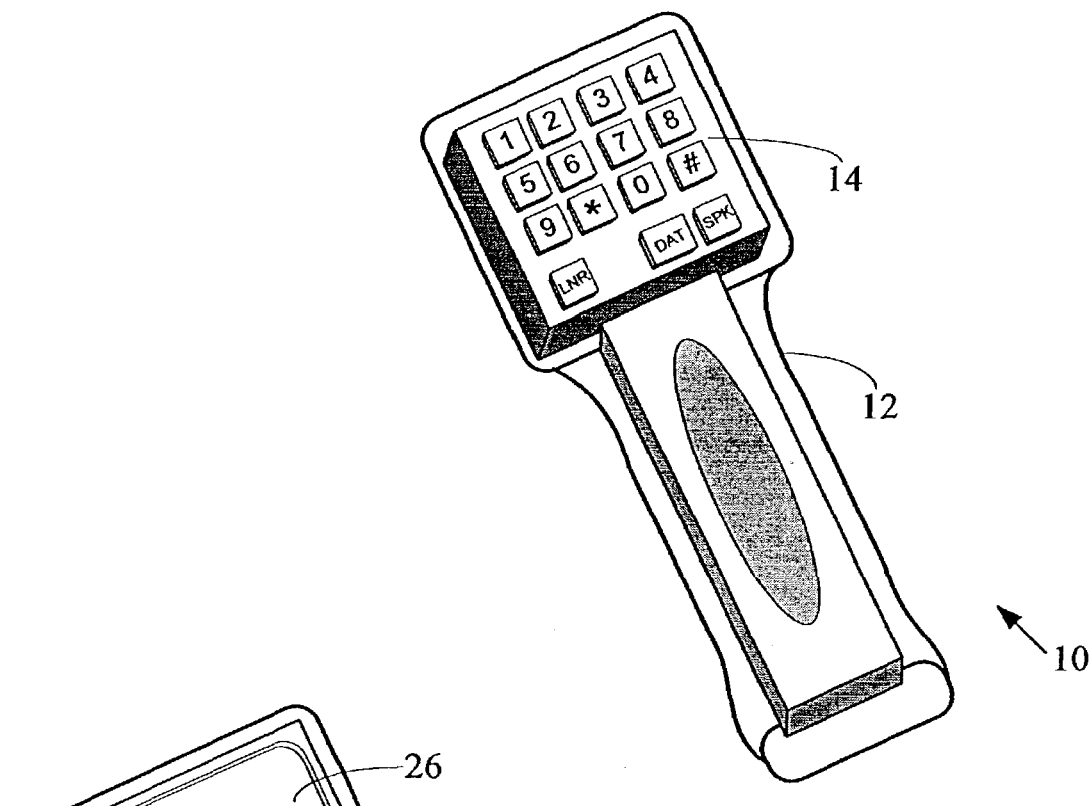
FIG. 1 shows a hand-held butt set used in the prior art.
Figure 2:
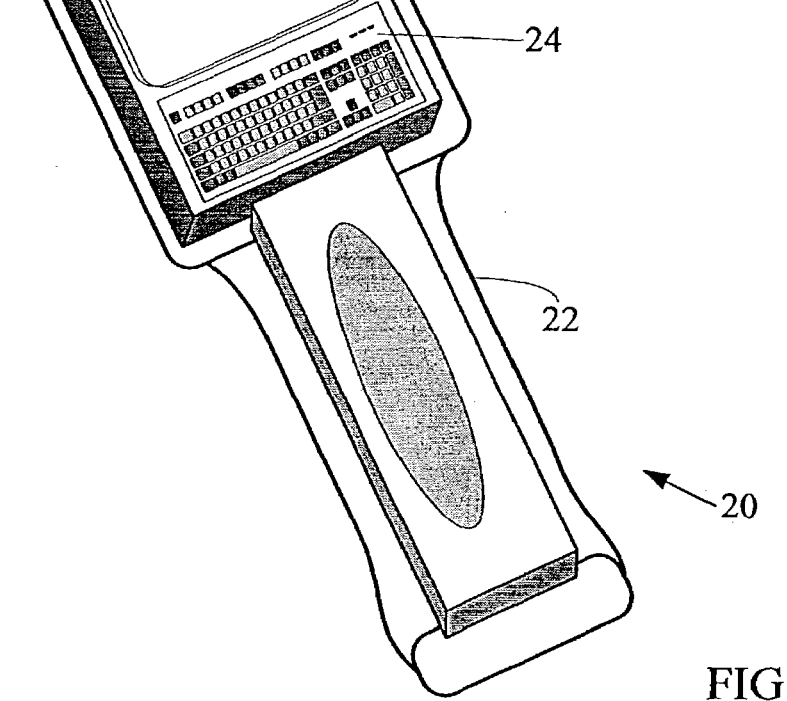
FIG. 2 illustrates one embodiment of a hand-held butt set according to the present invention.

FIG. 2 illustrates one embodiment of a hand-held butt set 20 according to the present invention. The butt set 20 includes a housing 22 that encloses the electronic circuitry and other components (as discussed in more detail hereinbelow with reference to FIG. 3) required to operate the butt set 20. A keypad or keyboard 24 and a display screen (or "display") 26 are provided on one face of the housing 22 to enable a network technician to perform line-testing and data-retrieval and analysis operations with the help of the keypad 24 and the display 26. The keypad 24 includes a number of keys that initiate various data retrieval and testing operations in addition to the operations that can be performed using the keys in the prior art butt set 10 shown in FIG. 1. As discussed hereinbelow, in addition to the telephone line-testing circuitry, the butt set 20 according to the present invention includes a web browser module 28 (FIG. 3) built in the housing 22. In addition to other benefits, as discussed hereinbelow with reference to FIG. 4, the web browser module 28 allows the network technician to access a network, such as the world wide web portion of the Internet, using the butt set 20 while in the field.

It is noted that the terms "telephone line" or "line" as used herein may be construed to include references to a regular telephone line, e.g., a PSTN (Public Switched Telephone Network) or a POTS (Plain Old Telephone System) telephone line, or to an ISDN (Integrated Services Digital Network) line, or to any other comparable communications line.

The housing 22 may be manufactured using a material that can withstand different weather conditions because the butt set 20 is typically used in the field. Further, the material for the housing 22 may preferably be lightweight as well as water-resistant and shock-absorbent so that the butt set 20 may be comfortably used by the technician in different weather conditions. The housing 22 may be manufactured using, for example, ABS (Acrylonitrile Butadiene Styrene) plastic.

The keypad 24 may include keys that perform functions similar to the buttons illustrated for the prior art butt set 10 in FIG. 1. Thus, for example, the keypad 24 may include keys for digits '0' through '9', for symbols '*' and '#', and for functions denoted by the buttons labeled LNR, DAT and SPK in FIG. 1. The keypad 24 also includes additional keys to perform such functions (described hereinbelow in more detail) as Internet access, telephone line testing, data retrieval from local memory, data transmission, etc. The keys on the keyboard 24 may be, for example, push-button keys, membrane keys or touch-pad keys. In one embodiment, the keypad 24 may include an electronic pointing device, e.g., a track ball or a touch-pad mouse (not shown), to allow the network technician to quickly and efficiently access various functions performed by the butt set 20. In that embodiment, the display of test data and other information on the display screen 26 may be in a form compatible with the Microsoft Windows® operating system. Here, various menu options may be displayed in letter-form (e.g., 'LINE TEST', 'WEB ACCESS', 'TELEPHONE CALL', etc.) with or without appropriate icons on the screen 26 and the network technician may select the desired function to be performed by the butt set 20 using the pointing device on the keypad 24.

The display screen 26 may be, for example, an LCD (Liquid Crystal Display) screen, a passive matrix display or a TFT (Thin Film Transistor) active matrix display. In one embodiment, the display screen 26 may be touch-sensitive and many or all of the functions performed using the keys on the keypad 24 may be performed by touching appropriate locations on the screen 26. In that embodiment, the keyboard 24 may have a reduced number of keys thereon or, if desired, the keyboard 24 may be eliminated altogether from the housing 22.

Figure 3:
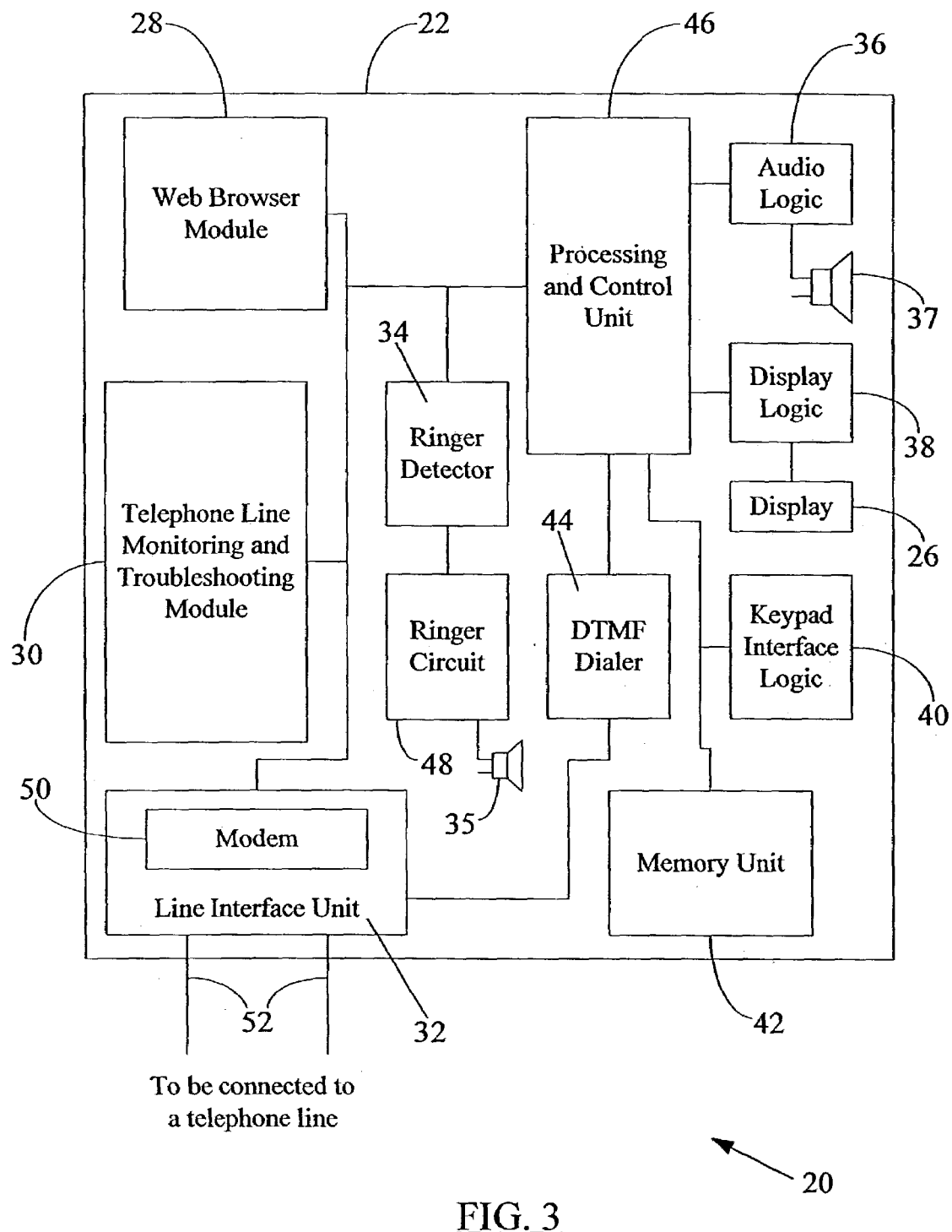
FIG. 3 shows an exemplary block diagram of the circuit modules contained in the butt set depicted in FIG. 2.

FIG. 3 shows an exemplary block diagram of the circuit modules contained in the butt set 20 depicted in FIG. 2. Besides the web browser module 28, the housing 22 may contain a telephone line monitoring and troubleshooting module (TLMTM) 30, a line interface unit (LIU) 32, a ringer detector 34, an audio logic unit 36, a display logic unit 38, a keypad interface logic unit 40, a memory or storage unit 42 and a DTMF (Dual Tone Multi Frequency) dialer 44. These circuit elements are shown coupled to a processing and control unit (PCU) 46 that manages and controls various operations performed by these circuit elements. The ringer detector 34 may be coupled to a ringer circuit 48, which converts an electrical telephone ringing signal detected by the ringer detector 34 into an audio telephone ringing signal. The LIU 32 may include a modem 50 so as to enable the web browser module 28 to transmit and receive digital information over a telephone line and to thereby access the Internet or other similarly-equipped test set as discussed hereinbelow with reference to FIG. 4. A pair of clips 52, e.g., alligator clips or bed-of-nails clips, may be connected on one end to the LIU 32 and may extend from the housing 22 so that the technician may attach the pair of clips 52 to a telephone line while performing telephone line-testing with the butt set 20.

Figure 4:
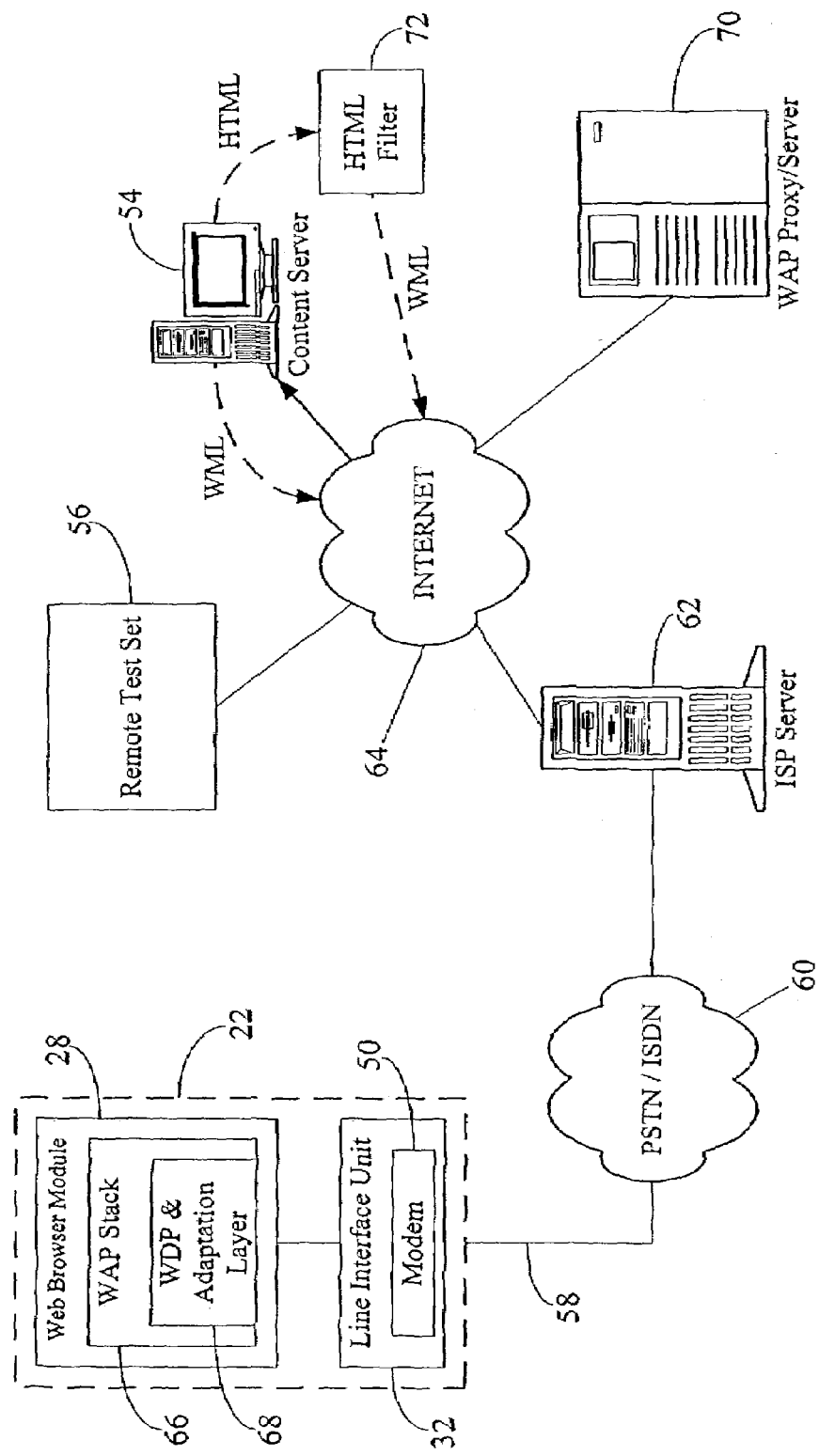
FIG. 4 depicts an arrangement wherein the butt set of FIG. 2 is in communication with a remotely-located information server or another similar test set.
Figure 7:
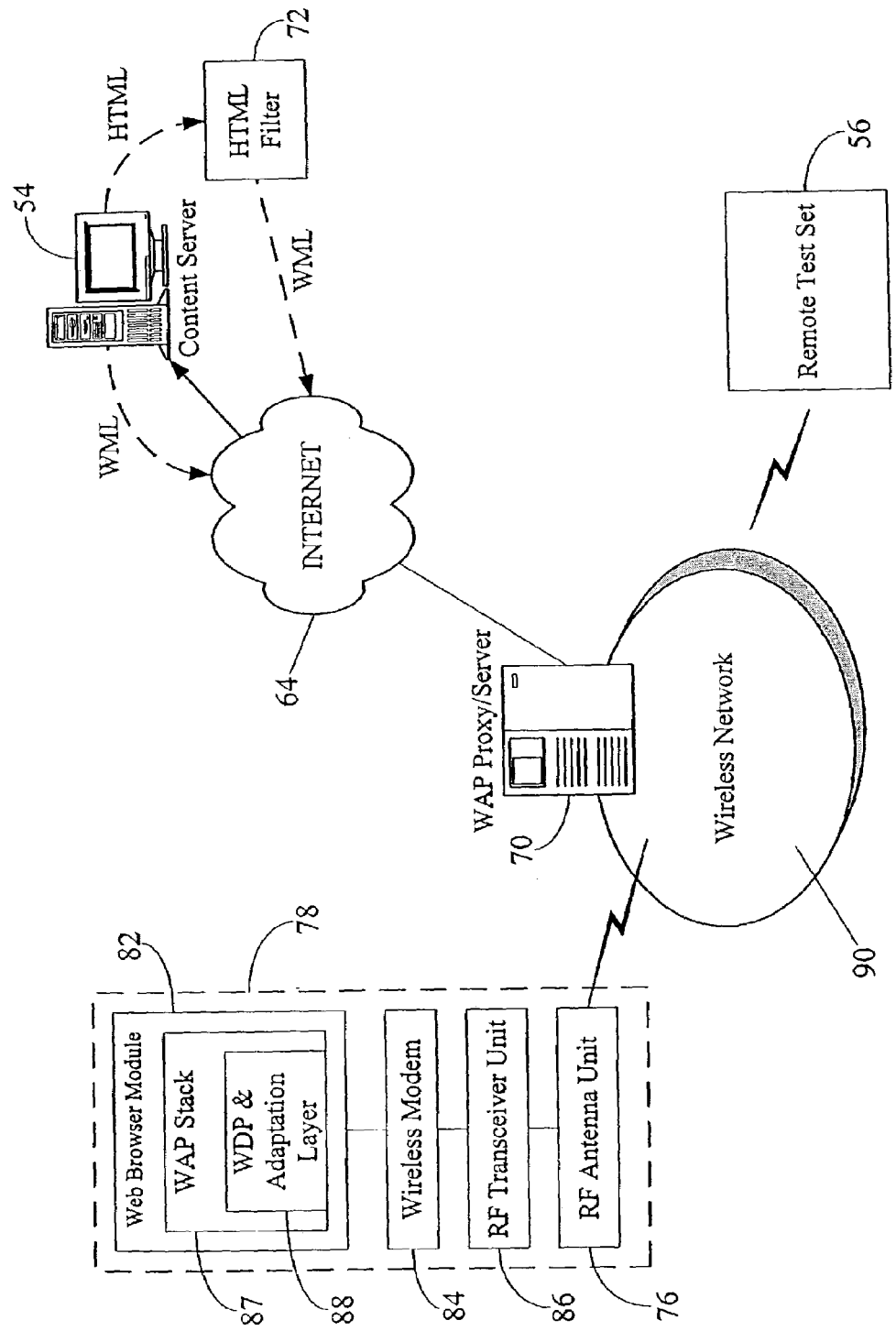
FIG. 7 depicts an arrangement wherein the butt set of FIG. 5 retrieves data from a remotely-located information server using a wireless network.

The web browser module 28 may include software code or routines which, when executed by the PCU 46, perform web browser functions upon execution. In one embodiment, the web browser module 28 may be implemented using a combination of software and hardware elements. The web browser software may include, for example, an HTML (Hyper Text Mark-up Language) browser or a WAP (Wireless Application Protocol) browser because of the small size and portable nature of the butt set 20 as well as because of the smaller display 26 and limited memory space (in the memory unit 42) available for the butt set 20. A commercially available HTML browser, for example, the Netscape Navigator™ or the Microsoft Internet Explorer™ may be selected for the web browser module 28. In case of a WAP browser, a commercially available WAP-compliant microbrowser (or wireless web browser) used, for example, in Nokia™ 7100 series cell phone or in the Palm Pilot™ handheld computer versions 5.0 or 6.0 may be selected. The HTML browser may "read" information received or stored in the HTML format, whereas the WAP browser may be able to "read" information having WAP content (e.g., information in the WML (Wireless Mark-up Language) format). The HTML browser or the WAP browser may be configured to perform data retrieval operations using wireline or wireless devices. For example, FIGS. 4 and 7 illustrate arrangements wherein a WAP browser retrieves data from a remotely-located information source using wireline and wireless networks respectively.

The web browser 28 may be activated using one or more keys on the keypad 24 and may be used to access information from a remote source. The web browser 28 may also retrieve locally stored information from the memory unit 42 whenever necessary. The web browser module 28 interacts with the PCU 46 to execute necessary software routines for web browsing. The software routines, upon execution, activate the modem 50 in the LIU 32 to electrically connect to the telephone line (not shown) to which the butt set 20 is attached via the pair of clips 52 and to accomplish dialed Internet access. In one embodiment, the web browser module 28 (including its hardware and/or software elements) may be a part of the PCU 46 and the PCU 46 may directly perform the web browsing or remote data retrieval functions.

Inclusion of the web browser 28 within the butt set 20 results in a standardized information interface for the butt set 20 because it dispenses with the need to have proprietary formats for information retrieval, storage and display. Line-specific (as well as manufacturer-specific) test information need not be in a manufacturer-dictated proprietary format, but, instead, may be in a generally available text format, e.g., the HTML format or the WML format. This allows for creation of a more generic test set (e.g., the butt set 20) because of reliance on the data available in a universal format, instead of a proprietary format. Testing-related data may be supplied (as hardware or software plug-in modules) by a vendor other than the manufacturer of the test set 20.

The TLMTM 30 performs routine telephone line maintenance tests as well as any requisite troubleshooting and fault monitoring. A network technician may need to test the condition of a telephone line in many situations, such as during routine maintenance of the network telephone lines, during installation of a new telephone line, during setting up of a new telephone subscriber account, or in response to a complaint by an existing telephone subscriber. Such line-testing is important to maintain trouble-free telephone communications. The TLMTM 30 may drive appropriate test signals and receive the telephone line's responses via the pair of clips 52 and the LIU 32, thereby testing the telephone line for conveyance of ringing signals and dial tone, for the noise level present on the line in normal operating conditions, etc.

The TLMTM 30 may dial one or more telephone numbers (via the LIU 32) over the telephone line being tested to verify whether dialed digits are carried by the telephone line to the local switching office, i.e., whether the telephone line is capable of allowing placement of a telephone call. In one embodiment, the TLMTM 30 includes the ringer detector 34, the ringer circuit 48 and the DTMF dialer 44 so as to better facilitate ringing signal detection and telephone number dialing performed by TLMTM 30. The TLMTM 30 may transmit test results to the PCU 46, which may then analyze the test results and visually display appropriate messages for the network technician on the display screen 26 or audibly alert the technician (e.g., using an audio tone of specific frequency), for example, when test results are not favorable.

The line interface unit 32 provides an electrical interface for signals travelling between various circuit elements inside the housing 22 and telephone lines connected to a local switching office (not shown) or a central switching office (not shown). Different signals, such as a ringing signal or a dial tone received over a telephone line being tested, digits dialed by the DTMF dialer 44, data communication signals transmitted and/or received by the web browser module 28, telephone line testing signals sent by the TLMTM 30 and the telephone line's responses received over the pair of clips 52, etc., may pass through the LIU 32 prior to reaching their appropriate destinations. The LIU 32 may provide signal amplification, for example, in a noisy signal environment.

The LIU 32 may also include circuitry for the modem 50 to facilitate data communication for the web browser module 28 over a telephone line.

The LIU 32 may, in another embodiment, include a two-wire-to-four-wire hybrid (2/4 wire hybrid) (not shown) that splits the telephone signals in a two-wire system within the butt set 20 into a four-wire system supported by the local telephone switching office to allow, for example, reduction in signal propagation losses, especially over a long-distance telephone communication. The 2/4 wire hybrid may be directly connected to the pair of clips 52 and, hence, to the telephone line being tested.

The ringer detector 34 receives the ringing signal from the PCU 46, which, in turn, receives the ringing signal from the LIU 32 and via the pair of clips 52 attached to the telephone line being tested. The ringing signal may be sent over the telephone line by the local switching office that is directly connected to the telephone line. The LIU 32 forwards the ringing signal to the PCU 46 that detects the received signal as a ringing signal and sends it to the ringer detector 34. Upon detecting the ringing signal, the ringer detector 34 activates the ringer circuit 48 that audibly generates ringing sound at a speaker 35 (included within the housing 22) alerting the network technician about the reception of the ringing signal. In one embodiment, both the ringer circuit 48 and the audio logic unit 36 share the same speaker unit, e.g., the speaker unit 37, built inside the housing 22 to generate audible sound from the electrical signals fed to the speaker unit. In such an embodiment, the additional speaker unit 35 may not be provided in the housing 22.

The housing 22 may include a hands-free speaker 37 that may be activated with an appropriate key (e.g., a key that functions similarly as the SPK button in FIG. 1) on the keypad 24 so that the technician may listen to various tones, noise and other signals over the telephone line in a hands-free manner. The audio logic unit 36 receives audio signals from the PCU 46 and sends them to the speaker 37 for generating audible sound. For example, a dial tone received by the LIU 32 (from the telephone line under test) is first sent to the PCU 46, which then forwards the dial tone to the audio logic unit 36. The audio logic unit 36 then feeds the speaker 37 with the dial tone signal, thereby allowing the technician to listen to the received dial tone and to identify any problems with it.

The display logic unit 38 monitors and manages display functionality for the butt set 20. The PCU 46 may generate proper commands and signals for the display logic unit 38, which, in turn, may control the display of visual information on the display screen 26. The display screen 26 may display all of the foregoing functions, and other additional information as discussed later hereinbelow, when the appropriate action is taking place. For example, the ringer detector 34 may inform the PCU 46 of the detection of the received ringing signal. The PCU 46 may then send an appropriate message to the display logic unit 38 to display the word "RINGING" on the screen 26. In another example, when the technician-dialed digits are collected by the PCU 46 (from the keypad interface logic 40) and once the DTMF dialer 44 starts dialing the entered digits via the LIU 32, the PCU 46 may instruct the display logic unit 38 to display the phrase "DIALING IN PROGRESS" on the visual display screen 26. Similarly, a message such as "ACCESSING THE INTERNET" may also be sent to the display logic unit 38 (to be displayed on the display screen 26) by the PCU 46 once the PCU 46 receives an indication from the web browser module 28 that Internet access is in progress. Other messages may also be conveniently displayed on the screen 26. For example, as soon as the technician presses a key on the keypad 24, the corresponding digit, symbol or command may be displayed on the display screen 26 by the display logic 38.

The keypad interface logic 40 is coupled to the keyboard 24 and receives signals sent from the keyboard 24 when the technician presses one or more keys thereon. The keypad interface 40 transmits the signals received from the keyboard 24 to the PCU 46 for further processing. The PCU 46 decodes the received signals and accordingly instructs appropriate circuit elements (including the web browser module 28) for necessary action. For example, as noted hereinbefore, the keypad 24 may have a key that functions similarly to the SPK button on the butt set 10 in FIG. 1. When a technician presses that key on the keypad 24, the keypad interface logic 40 transmits an appropriate signal or coded command to the PCU 46, which identifies the received signal as an indication to activate the hands-free speaker unit 37. The PCU 46 may then instruct the audio logic unit 36 to activate the speaker unit 37 as discussed hereinbefore.

The memory or storage unit 42 provides memory for storage of data, such as data retrieved by the web browser module 28. The data stored locally in the memory unit 42 may be in the HTML or the WML format depending on the compatibility with the browser software present in the web browser module 28. The data may include certain manufacturer-specific or telephone line-specific data, for example, information about mechanical and electrical characteristics for one or more telephone lines being tested. Such information may be manufacturer-specific and may be in the form of plug-in hardware memory modules (not shown) that may be inserted inside the housing 22 as part of the memory unit 42 or may be externally attached as appendages to the housing 22 using appropriate adapter slots (not shown) provided on the housing 22. Alternatively, the manufacturer-specific information may be initially retrieved as software "plug-ins" from the corresponding manufacturer's website and may then be stored in the memory unit 42.

The memory unit 42 may include volatile and/or non-volatile memory, such as a RAM (Random Access Memory), a ROM (Read Only Memory), an EEPROM (Electrically Erasable Programmable Read Only Memory), flash memory, or other similar memory units. A volatile memory may lose the data stored therein if the power applied thereto is removed. During data retrieval, e.g., from the Internet, the technician operating the butt set 20 may wish to place certain data in a temporary storage space until the technician reviews the received data and determines which portion, if any, of that data is to be stored in the non-volatile memory within the butt set 20. A volatile memory may provide that temporary storage in such an event. Furthermore, during telephone line monitoring and troubleshooting operations, the PCU 46 may need to perform certain mathematical operations and analysis on the test results sent by the TLMTM 30. During such operations, the PCU 46 may also store intermediate calculation results in the volatile memory.

The DTMF dialer 44 communicates with the PCU 46 and receives the keypad 24 entries sent to the PCU 46 via the keypad interface logic 40. The DTMF dialer 44, in turn, generates corresponding DTMF signals to be sent to the local telephone switching office via the LIU 32 and over the telephone line to which the pair of clips 52 is attached. When the local switching office supports DTMF dialing, the technician may thus test a telephone line for tone dialing capability using the butt set 20.

The PCU 46 manages and controls various operations performed by different circuit elements connected thereto. The PCU 46 functions as a centralized location to send and receive various commands and information. For example, the PCU 46 may receive an indication from the keypad interface logic 40 that the network technician wishes to test a telephone line. The PCU 46 may then send a command to the TLMTM 30 instructing the TLMTM 30 to initiate the required testing operation and may simultaneously activate the LIU 32 so that the TLMTM 30 may transmit and receive requisite test information over the telephone line under test. The PCU 46 may receive test results from the TLMTM 30 and may further analyze or process the results prior to sending them to the display logic unit 38 for visual display on the screen 26. The PCU 46 may also execute audio and video data files received from the Internet using the web browser module 28 and send appropriate audio and video signals to the audio logic unit 36 and the display logic unit 38 respectively. Some exemplary PCUs include the Intel x86 series microprocessors or the Motorola 68x series microprocessors.

The modem 50 modulates and demodulates the information transmitted and received respectively over the telephone line. The modem 50 may employ one or more of a number of modulation schemes including, for example, FSK (frequency shift keying), DPSK (differential phase shift keying), QAM (quadrature amplitude modulation) and TCM (trellis-coded modulation). The modem 50 may function in a full duplex communication mode allowing simultaneous transmission and reception of electrical signals. The modem 50 may perform error correction for transmitted and received data. The data communication speed of the modem 50 may be, for example, 56 kbps (kilo bits per second) with automatic fall-back capability in the event of noisy line conditions or due to a mismatch between the data communication speeds of the modem 50 and the device with which the modem 50 is communicating. Any Hayes® compatible modem may be used for the modem 50.

It is noted that all the electronic circuit elements that are housed within the butt-set housing 22 may be supplied electrical power from the local telephone company switching facility via the telephone line (not shown) to which the butt set 20 is attached. If the power from the local switching facility is not sufficient, then an additional power source such as a battery (not shown) may be placed within the housing 22 to supply the requisite power to various circuit elements.

FIG. 4 depicts an arrangement wherein the butt set 20 of FIG. 2 is in communication with a remotely-located information server 54 or another similar test set 56. The butt set housing 22 is illustrated as a dotted box, which is shown to contain the web browser module 28 and the LIU 32. The housing 22 shown in FIG. 4 is the same as that depicted in FIG. 3, except that certain circuit elements are not illustrated for the sake of simplicity. The housing 22 is shown connected to a PSTN (or POTS) telephone line or an ISDN line 58 using the pair of clips 52. The telephone line 58 may be the same line that is being tested by the network technician or may be a different line.

The telephone line or the ISDN line 58 is shown connected to the corresponding communication network—the PSTN (or the POTS) or the ISDN respectively—which is represented as a cloud 60 labeled as PSTN/ISDN. It is noted that the discussion given hereinbelow with references to PSTN 60 applies equally to a configuration wherein the butt set 20 is connected to the ISDN line 58 and the network is an ISDN network 60. The local telephone switching facility may be the only entity constituting the PSTN/ISDN cloud 60 and connecting the telephone line 58 to an ISP (Internet Service Provider) server 62. Alternatively, a signal travelling over the telephone line 58 may have to go through a number of switching offices or terminal facilities within the PSTN/ISDN cloud 60 before it reaches the ISP server 62.

As noted hereinabove, the web browser module 28 (via the PCU 46) may access a remote source of data, e.g., a content or information server 54. The web browser software, upon execution, accesses the telephone line 58 using the modem 50 in the LIU 32 and dials into the ISP server 62. The ISP server 62 provides a direct connection to the Internet 64 and, hence, the web browser module 28 gets access to the remotely-located content server 54, which may also be connected to the Internet 64.

The information or content server 54 may store manufacturer-specific or telephone line-specific data as well as other line testing-related information in a world-wide-web information text file format, e.g., the HTML format. Alternatively, the information server 54 may store relevant information in the WML format as discussed hereinbelow. In one embodiment, the ISP server 62 may itself include the data requested from the content server 54. In that embodiment, the ISP server 62 need not access the remote content server 54 via the Internet 64. Instead, the ISP server 62 may itself transmit the requested data to the web browser module 28 without further accessing the Internet 64.

The remote content server 54 may protect the test data, manufacturer-specific software "plug-in" modules or program routines, or any other information stored therein from unauthorized access. In that case, upon receiving a query from the ISP server 62 that information access is desired, the content server 54 may transmit a response back to the web browser module 28 (via the ISP server 62 and the PSTN/ISDN 60) requesting the network technician to enter the correct password for data access. The network technician may enter the password using the keypad 24 (FIG. 2). The PCU 46 may receive the entered password (from the keypad interface logic 40) and forward it to the web browser module 28, which sends the password to the content server 54 via the ISP server 62 and the Internet 64. The data transfer between the web browser module 28 and the content server 54 may then proceed as usual.

The remote test set 56 may be another butt set that has circuit elements (including the web browser module 28) similar to the butt set 20 of the present invention. Alternatively, the remote test set 56 may be another portable telecommunication test device with data communication capability. The remote test set 56 may be connected to the Internet 64 via another wireline communication network (not shown), e.g., the PSTN, the ISDN or a wired LAN (local area network). The network technician operating the butt set 20 may first access (using the web browser module 28 and via the Internet 64) a website operated by the telephone service provider. The website may allow the technician to enter and transmit an electronic message, e.g., an e-mail, addressed to the remote test set 56 and requesting certain data stored in the local memory within the remote test set 56. Upon receipt of the electronic message, the operator of the remote test set 56 may transmit the locally stored data, e.g., in an e-mail format, to the service provider's website. The web browser module 28 in the butt set 20 can then retrieve the data from the service provider's website via the Internet 64.

As noted hereinbefore, the web browser module 28 may include an HTML browser or a WAP browser. In the embodiment illustrated in FIG. 4, the web browser module 28 includes the WAP browser software represented as a WAP stack 66. The WAP architecture provides a scaleable and extensible environment for application development for mobile communication devices such as, for example, the butt set 20. The WAP protocol is designed in the form of a layered architecture wherein each of the layers is accessible by the layers above, as well as by other services and applications running on the WAP platform. The WAP stack has the application layer (not shown) at its top, which is successively followed by the session layer (not shown), the transaction layer (not shown), the security layer (not shown) and the transport layer, which is referred to as a WDP (Wireless Datagram Protocol) and Adaptation layer 68 in FIG. 4 (and interchangeably referred to hereinbelow as "the WDP layer" or "the adaptation layer" for the sake of clarity).

The WDP layer 68 is the lowest layer in the WAP stack that is in direct contact with a physical network carrying the WAP data. The WDP layer 68 operates above the data-capable bearer services supported by various physical networks. A bearer service is a data transport mechanism that carries the WDP protocols between two devices. Some examples of bearer services include, for example, SMS (Short Message Service), circuit switched data and packetized data. Examples of some physical networks that carry the bearer data include a GSM (Global System for Mobile Communications) or another TDMA-based (Time Division Multiple Access) wireless network, a wireline network (e.g., the PSTN or the ISDN 60, or the Internet 64), etc. The WDP protocol can be mapped onto different bearers, with different characteristics. The adaptation layer 68 is the layer of the WDP protocol that maps the WDP protocol functions directly onto a specific bearer. Thus, operationally, the WDP layer 68 provides convergence between a given bearer service and the rest of the WAP stack 66. The content of the adaptation layer 68 may be different for each bearer depending on, for example, specific capabilities and characteristics of that bearer service.

In the embodiment of FIG. 4, the bearer data may include packetized data over a combination of wireline networks, i.e., the PSTN 60 and the Internet 64. The adaptation layer 68 in the WAP stack 66 may be configured to map WDP protocol functions onto the packetized data supported by these wireline networks to facilitate communication between the web browser module 28 and a remote source of data (i.e., the content server 54 or the remote test set 56). It is further noted that each bearer service for which WDP is specified supports a datagram service. The packetized data bearer service in FIG. 4 may support IP (Internet Protocol) based data routing. For bearer services supporting IP, the WDP protocol may be UDP (User Datagram Protocol) that provides port-based addressing (e.g., source port, destination port, etc.) which may be combined with the segmentation and reassembly features of IP-based routing to implement a connectionless datagram service between two devices.

A WAP proxy/server 70 may be provided as part of the data transfer arrangement to translate WAP requests transmitted by the web browser module 28 into WWW (World Wide Web) or Internet requests supported by the content server 54. The data packets (including information requests sent to the content server 54) generated or received by the web browser module 28 (using the WDP layer 68) may be in a WAP-supported format, e.g., the WML format. The ISP server 62 receives the WAP requests sent by the web browser module 28 in the form of WDP datagrams adapted to be transmitted over the underlying physical carrier networks, here, the PSTN/ISDN 60 and the Internet 64. These WAP requests are forwarded by the ISP server 62 to the WAP proxy/server 70, which, in turn, sends appropriate WWW requests, e.g., in the HTML format, to the content server 54.

The content server 54 may provide the requested data or information in a specific format, e.g., in the HTML format, in the WML format, etc., depending on its design and implementation in a given network. If the content server 54 provides information in WAP content (e.g., in the WML format), then the WAP proxy/server 70 may retrieve the information directly from the information server 54 via the Internet 64 and forward the retrieved information to the web browser module 28 via the ISP server 62 and the PSTN/ISDN network 60. However, if the content server 54 provides information in WWW content (e.g., in the HTML format), then a filter may be used to translate the WWW content into WAP content. For example, an HTML filter 72 may translate information or data received in the HTML format into that in the WML format as illustrated by dotted lines in FIG. 4. The WAP proxy/server 70 may receive this translated data from the HTML filter 72 and deliver it to the web browser module 28 via the Internet 64, the ISP server 62 and the PSTN/ISDN network 60.

In one embodiment, the WAP proxy/server 70 may itself contain the data and information requested by the web browser module 28. In that embodiment, instead of the content server 54, the WAP proxy/server 70 may itself provide the requisite data and information to the web browser module 28. Thus, the WAP proxy/server 70 may not access another content server, e.g., the information server 54, and may, instead, directly supply the requested information in a WAP-supported format, e.g., the WML format, to the web browser module 28 via the Internet 64, the ISP server 62 and the PSTN/ISDN network 60. In this configuration, the WAP proxy/server 70 may function as an origin or gateway server (instead of a proxy) that responds to requests from the WAP client, i.e., the web browser module 28, directly.

Instead of the WAP browser discussed with reference to FIG. 4, the web browser module 28 may include an HTML browser (not shown). In a data transfer arrangement with the HTML browser, the WAP proxy/server 70 and the HTML filter 72 may not be necessary. Further, the content server 54 may be configured to transfer data in the HTML format so as to be compatible with the data format supported by the HTML browser in the web browser module 28. All other components in the data transfer arrangement may remain the same as that illustrated in FIG. 4. Thus, in view of the foregoing discussion of remote data transfer with a WAP browser (FIG. 4), additional discussion of data transfer using an HTML browser is omitted to prevent repetition.

Figure 5:
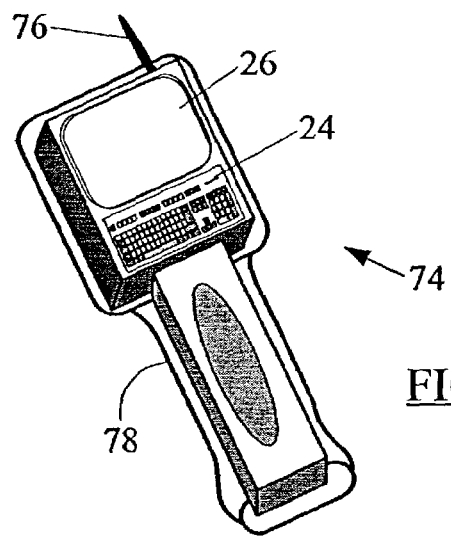
FIG. 5 is a perspective view of another embodiment of a hand-held butt set according to the present invention.

FIG. 5 is a perspective view of another embodiment of a hand-held butt set 74 according to the present invention. The butt set 74 employs wireless devices to transfer data and information between the butt set 74 and a remote source of data. An antenna, e.g., the RF (radio frequency) antenna 76, is provided on the housing 78 of the butt set 74 to allow wireless data communication. Except for the inclusion of circuit elements for wireless communication, the housing 78 contains essentially the same components as those illustrated in FIG. 3 for the housing 22 of the butt set 20 (FIG. 2). Further, the keypad 24 and the display screen 26 for the butt set 74 may be similar to those illustrated with respect to the butt set 20 in FIG. 2. Therefore, elements in FIGS. 5 and 6 that have similar functionality as those illustrated in FIGS. 2 and 3 respectively are represented with the same numerals and discussion of these common elements is omitted hereinbelow for the sake of clarity.

Figure 6:
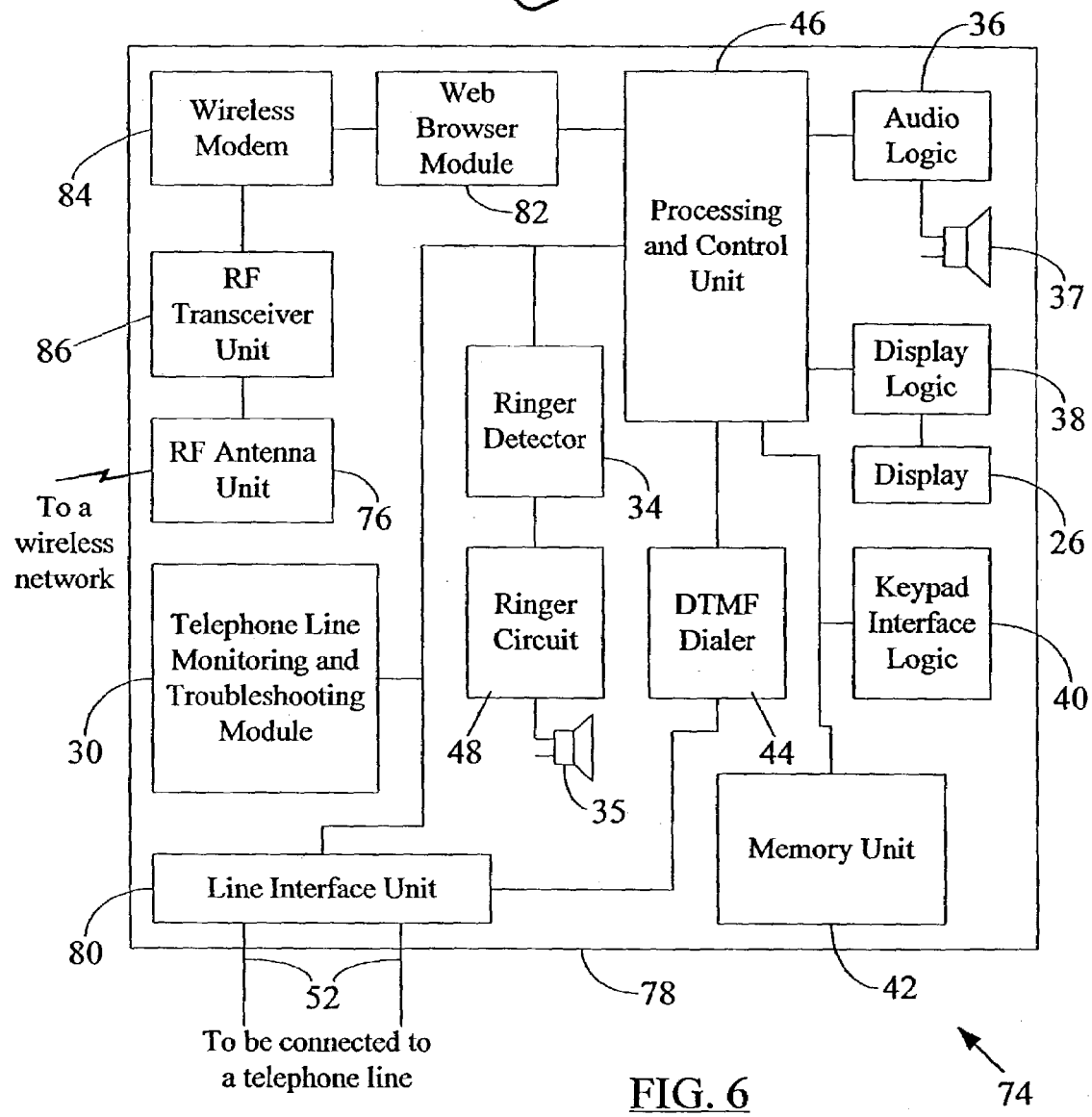
FIG. 6 illustrates an exemplary block diagram of the circuit modules contained in the butt set depicted in FIG. 5.

FIG. 6 illustrates an exemplary block diagram of the circuit elements contained in the butt set 74 depicted in FIG. 5. The housing 78 is shown to contain essentially the same components as those depicted for the housing 22 in FIG. 3. However, there are three differences between the two housings. First, unlike the LIU 32 in the housing 22 in FIG. 3, the line interface unit 80 in the housing 78 does not include a wireline data modem (such as the modem 50 in FIG. 3). Instead, the housing 78 includes a wireless modem 84 to facilitate data transfer using a wireless network as discussed hereinbelow with reference to FIG. 7. If the wireless network is a cellular network (e.g., a TDMA-based wireless network, a CDMA-based (Code Division Multiple Access) wireless network, or a GSM-based (Global System for Mobile Communications) wireless network), then the wireless modem 84 may be capable of data transfer using the message format supported by the given cellular network. The Ricochet SE wireless modem manufactured by Metricom, Inc. of Los Gatos, Calif., USA or a wireless modem manufactured by US Robotics may be selected for the wireless modem 84.

Second, the web browser module 82 in the housing 78 is configured to transfer data over a wireless network and, hence, the web browser module 82 need not be connected to the LIU 80 because the LIU 80 may be operative over a wireline network (e.g., the PSTN) in a way similar to that discussed hereinbefore with respect to the LIU 32 in FIG. 3. Third, unlike the housing 22 in FIG. 3, the housing 78 includes circuit elements that facilitate wireless data communication. These elements include a transceiver unit, here, the RF transceiver unit 86, and the RF antenna unit 76. The RF transceiver unit 86 sends RF signals to the RF antenna 76 for transmission to the wireless network and receives RF signals from the RF antenna 76 and forwards them to the wireless modem 84 for further processing. The RF antenna 76 provides the necessary signaling interface between a wireless network and the web browser module 82 that needs to access the wireless network.

FIG. 7 depicts an arrangement wherein the butt set 74 of FIG. 5 retrieves data from the remotely-located information server 54 using a wireless network 90. The wireless network 90 may be, for example, an analog wireless network (e.g., the AMPS (Advanced Mobile Phone System) network), a digital wireless network including cellular networks (e.g., the TDMA or CDMA-based wireless networks), a wireless LAN (Local Area Network) or a WLL (Wireless Local Loop) configuration. A portion of the wireless network 90 may include one or more microwave links for satellite-based communication. The WAP proxy/server 70 of FIG. 4 is illustrated as located in the wireless network 90. Other components, e.g., the Internet 64, the content server 54 and the HTML filter 72, are illustrated having the same numerical designations as those shown in FIG. 4. These components perform in the same manner as discussed hereinbefore with reference to FIG. 4 and, hence, further discussion of data retrieval by the WAP proxy/server 70 from the content server 54 is omitted to prevent repetition.

The remote test set 56 may be configured to communicate with the web browser module 82 via the wireless network, with or without the help of the WAP proxy/server 70. The remote test set 56 in FIGS. 4 and 7 may operate over wireline as well as wireless networks. Similarly, the wireless modem 84, the RF transceiver unit 86 and the RF antenna unit 76 for the butt set 74 may be combined with other circuit elements shown in FIG. 3 to allow the butt set 20 (FIG. 2) to operate over wireline as well as wireless networks. In that case, the technician may select an appropriate communication option using the keypad 24. Here, the web browser module 28 (FIG. 3) may be modified to responsively connect to a wireline data modem (e.g., the modem 50) or a wireless modem 84 (FIG. 6) depending on the desired mode of data communication.

The web browser module 82 in the housing 78 may include a WAP browser with a WAP stack 87 having a layered architecture similar to that described hereinbefore with reference to the WAP stack 66 in FIG. 4. In the embodiment of FIG. 6, however, the WDP and adaptation layer 88 in the WAP stack 87 is modified to map WDP protocol functions onto the packetized data (i.e., the bearer service) supported by the wireless network 90 to facilitate communication between the web browser module 78 and the remote source of data (i.e., the content server 54 or the remote test set 56). The WDP layer 88 may thus adapt the datagrams transmitted and received thereby to conform to the data transmission protocol specified by the physical data carrier network, i.e., the wireless network 90. As noted hereinbefore, the WAP browser in the web browser module 82 may communicate with the remotely-located source of data (e.g., the content server 54) using a WAP-supported data format, e.g., the WML format.

The wireless modem 84 may receive the WAP content from the WDP layer 88 and perform necessary data encoding thereon to prepare the WAP content to be sent over the wireless network 90. A corresponding decoding may be performed by the wireless modem 84 upon receipt of the data from the RF transceiver unit 86 prior to sending the decoded WAP content to the WDP layer 88 and other layers above it for further processing. The RF transceiver unit 86 modulates data or requests received from the wireless modem 84 to be transmitted over an RF transmission channel linking the housing 78 with the wireless network 90. The modulated data are then wirelessly transmitted to the network 90 by the RF antenna unit 76. Upon reception of any data or information from the wireless network 90 (i.e., the data sent by the remote test set 56 or the content server 54) the RF antenna unit 76 forwards the RF-modulated data to the RF transceiver unit 86, which demodulates the data and sends them to the wireless modem 84 for further processing and transfer to the web browser module 82.

It is noted that the embodiments discussed hereinbefore with reference to FIGS. 4 and 7 depict respective web browser modules 28 and 82 as being equipped with software routines implementing a WAP browser. However, the foregoing discussion with reference to the WAP browser-based butt sets 20 and 74 may also be applied to butt sets having web browser modules with HTML browsers, instead of WAP browsers. A web browser module with an HTML browser may be similarly configured to perform data retrieval and transmission operations using wireline as well as wireless devices. A butt set may also include a web browser module with browser software that supports a content format that is different from HTML or WML such as, for example, the JavaScript scripting language. A butt set may be conveniently designed to include such a web browser module for data communication.

The foregoing describes exemplary embodiments of a butt set with a web browser incorporated therein. The embodiments discussed hereinabove are equipped with web browser modules to allow network technicians to access the Internet as well as other remotely-located sources of information to retrieve data and other useful technical information while in the field for telephone line maintenance, troubleshooting or repair. It is noted, however, that a suitable web browser may be similarly incorporated in other portable or hand-held telecommunication test equipment. For example, an HTML browser may be incorporated into an MGTS (Message Generator Traffic Simulator) diagnostic system manufactured by Tekelec, 26580 W. Agoura Road, Calabasas, Calif., USA 91302. An MGTS functions as a diagnostic tool during network implementation of signaling products (e.g., SSPs (Service Switching Points), MSCs (Mobile Switching Centers), BTSs (Base Transceiver Stations), etc.) for installation and verification testing and for operational acceptance testing.

Similarly, an HTML browser or a WAP browser may be incorporated in a protocol analyzer or a signaling test set such as, for example, the Hewlett Packard HP37900 protocol analyzer used to test SS7 (Signaling System Number 7) circuits. A web browser-equipped protocol analyzer may allow use of generic or standard plug-ins for new protocols instead of proprietary plug-ins. A communications analyzer that tests functionality of a number of communication networks, e.g., the ATM-based (Asynchronous Transfer Mode) network, the SONET (Synchronous Optical Network), one or more levels of DS (Digital Service) circuits, etc., may also be modified to include a built-in HTML or WAP browser. For example, the T-BERD® analyzer manufactured by TTC, 20400 Observation Drive, Germantown, Md., USA 20876, may be configured to incorporate a standard HTML or WAP browser to transmit and receive various information over a test line during network testing.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A communications test device, comprising:
   a hand-held housing;
   a processor located in the housing;
   a protocol analyzer located in the housing and in communication with the processor, wherein the protocol analyzer is operative to perform test operations on a communications network;
   a web browser module located in the housing and in communication with the processor, the web browser module including a communications stack designed for wireless communications, the web browser module operative to facilitate communications between the communications test device and an external source of information, and the web browser module operative to receive audio data files and video data files from the external source of information;
   a power supply; and
   a removable memory device for storing results of the test operations and data received by the web browser module,
   wherein the test operations performed by the protocol analyzer are customizable,
   wherein the external source of information includes a remote communications test device,
   wherein the communications test device operates without input from a physical keyboard, and
   wherein the communications test device operates over a wireline communications network and a wireless communications network.

2. The device of claim 1, further comprising a wireless modem and a wireline modem in communication with the web browser module.

3. The device of claim 1, further comprising a DTMF dialer module in communication with the processor.

4. The device of claim 1, wherein the web browser module includes a WAP browser and the communications stack designed for wireless communications includes a WAP stack.

5. The device of claim 1, wherein the web browser module includes a Java browser operative to receive Java files located external to the test device.

6. The device of claim 1, further comprising a testing module located in the housing and in communication with the processor and the web browser module.

7. The device of claim 6, wherein the testing module drives a test on a Signaling System Number 7 (SS7) circuit.

8. The device of claim 6, wherein the testing module is for testing a telephone line noise level.

9. The device of claim 6, wherein the testing module is for testing a telephone line for conveyance of one of a ringing signal and a dial tone.

10. The device of claim 1, wherein the hand-held housing comprises a material that is water-resistant and shock-absorbent.

11. The device of claim 10, wherein the material is Acrylonitrile Butadiene Styrene (ABS).

12. The device of claim 1, wherein the communications network is an Asynchronous Transfer Mode (ATM) network.

13. The device of claim 1, wherein the communications network is a Synchronous Optical Network (SONET).

14. The device of claim 1, wherein the communications network includes a Digital Service (DS) circuit.

15. The device of claim 1, wherein the communications network includes fiber optic cables.

16. The device of claim 1, wherein the communications test device and the external source of information communicate via Radio Frequency (RF) signals.

17. The device of claim 1, wherein the communications test device and the external source of information communicate using Ricochet protocol.

18. The device of claim 1, wherein the communications test device and the external source of information communicate via Internet Protocol (IP).

19. The device of claim 1, further comprising a pair of clips extending from the hand-held housing, wherein the pair of clips are operative to attach the communications test device to a line of the communications network being tested.

20. The device of claim 1, further comprising an antenna originating within the housing and protruding therefrom to a predetermined distance, wherein the antenna is operative to provide a signaling interface between the communications test device and the external source of information via the wireless communications network.

21. The device of claim 1, wherein the communications test device is operative to
   transmit an electronic message addressed to the remote communications test device; and
   receive an electronic message from the remote communications test device addressed to the communications test device.

22. A communications test device, the device comprising:
   a hand-held housing;
   a processor located in the housing;
   a protocol analyzer located in the housing and in communication with the processor;

a web browser module located in the housing and in communication with the processor, the web browser module including a communications stack designed for wireless communications, the web browser module operative to facilitate communications between the communications test device and an external source of information, and the web browser module operative to receive audio data files and video data files from the external source of information;

a testing module located in the housing and in communication with the processor, wherein the testing module is operative to perform test operations on a communications network;

a power supply; and a removable memory device for storing results of the test operations and data received by the web browser module, wherein the test operations performed by the testing module are customizable;

wherein the external source of information includes a remote communications test device, wherein the communications test device operates without input from a physical keyboard, and wherein the communications test device operates over a wireline communications network and a wireless communications network.

23. The communications test device of claim 22, wherein the testing module drives a test signal on a telephone line and receives a response signal from the telephone line.

24. The communications test device of claim 22, wherein the external source of information includes a content server located external to the communications test device.

25. The communications test device of claim 22, wherein the communication network includes one or more of the following:

a Local Area Network (LAN); and the Internet.

26. The communications test device of claim 22, further comprising a wireless modem and a wireline modem.

27. The communications test device of claim 22, wherein the communications network is a wireless network.

28. The communications test device of claim 22, wherein the test device includes a line interface unit.

29. The device of claim 22, wherein the web browser module is further operative to receive Java files from the external source of information.

* * * * *